United States Patent [19]

Eke

[11] Patent Number: 4,620,743

[45] Date of Patent: Nov. 4, 1986

[54] SLIDE MOUNTED DOOR HINGE ASSEMBLY

[75] Inventor: Alan B. Eke, Fairmont, Minn.

[73] Assignee: Glasstite, Inc., Dunnell, Minn.

[21] Appl. No.: 705,327

[22] Filed: Feb. 25, 1985

[51] Int. Cl.$^4$ ............................................. B60J 5/12
[52] U.S. Cl. ...................................... 296/146; 296/56; 49/197; 16/364
[58] Field of Search ................ 296/146, 155, 56; 49/197, 254, 257; 16/362, 364

[56] References Cited

U.S. PATENT DOCUMENTS

| | | | |
|---|---|---|---|
| 1,517,267 | 12/1924 | Tobey | 49/197 |
| 2,290,830 | 7/1942 | Ferris | 49/197 |
| 2,669,499 | 2/1954 | Vanderplank | 49/257 |
| 3,357,738 | 12/1967 | Bourlier | 296/219 |
| 3,376,668 | 4/1968 | Smedstad | 49/197 |
| 3,794,401 | 2/1974 | Dean et al. | 49/197 |
| 4,184,709 | 1/1980 | Kim | 296/146 |
| 4,272,121 | 6/1981 | Kim | 296/216 |
| 4,335,916 | 6/1982 | Gutgsell | 296/100 |
| 4,511,173 | 4/1985 | Wentzel | 296/146 |

Primary Examiner—Robert R. Song
Attorney, Agent, or Firm—Palmatier & Sjoquist

[57] ABSTRACT

A vehicle body having a roof, depending sidewalls, a rear opening and a door for closing the opening wherein the door is pivotally and slidably mounted to the vehicle body by a slide mounted door hinge assembly. The assembly includes an elongated guide track affixed to the vehicle body extending perpendicularly from the opening and a hinge with a sliding leaf slidably connected to the guide track and a door leaf affixed to the door adjacent the track.

12 Claims, 9 Drawing Figures

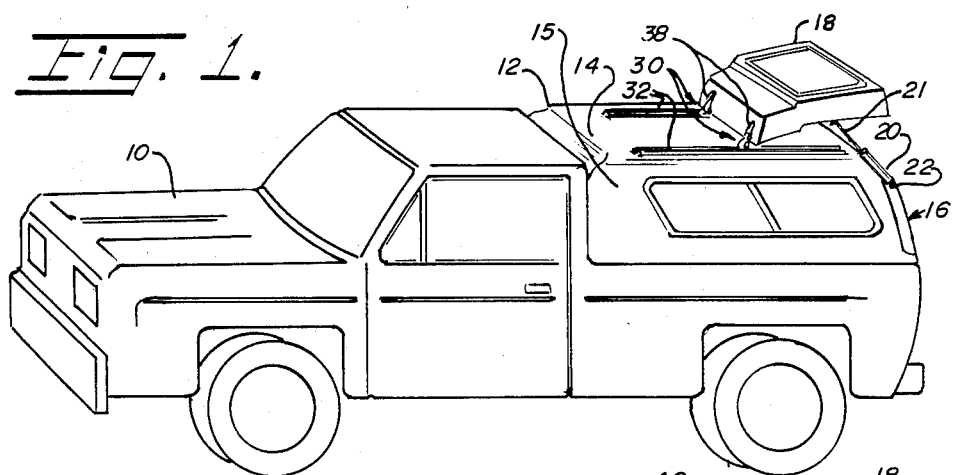
Fig. 1.
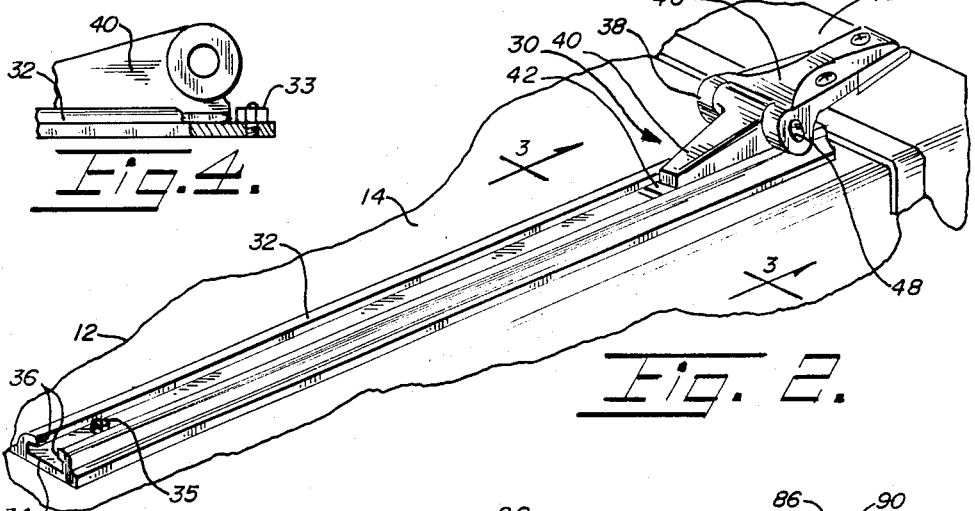
Fig. 4.
Fig. 2.
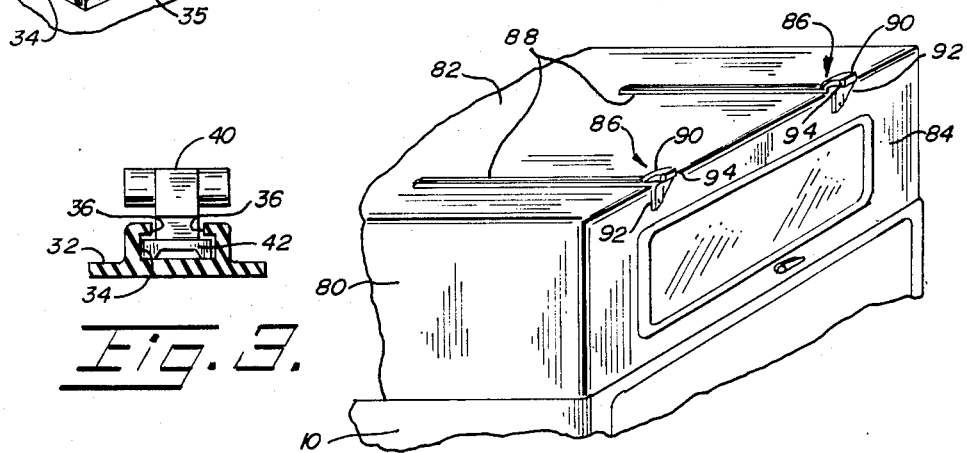
Fig. 3.
Fig. 4.

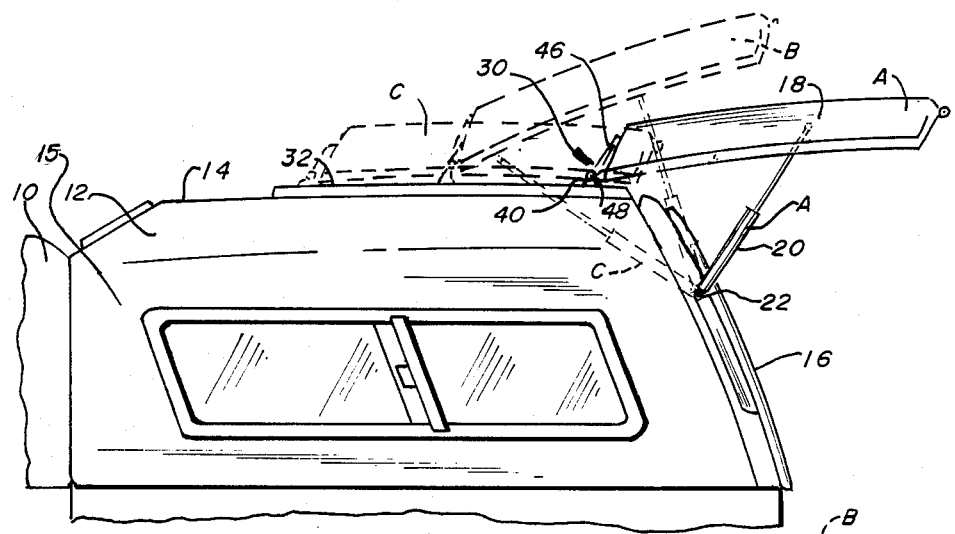
Fig. 5.
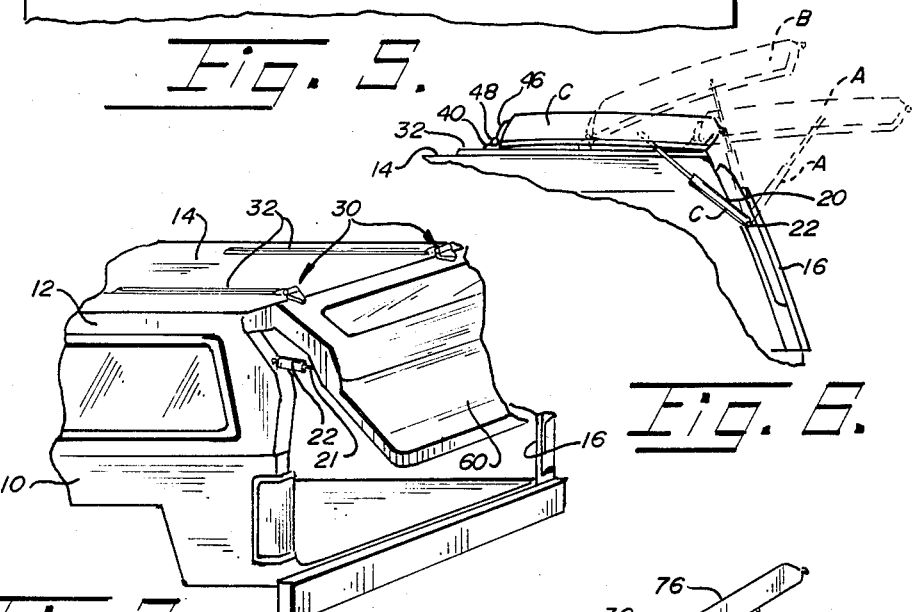
Fig. 6.
Fig. 7.
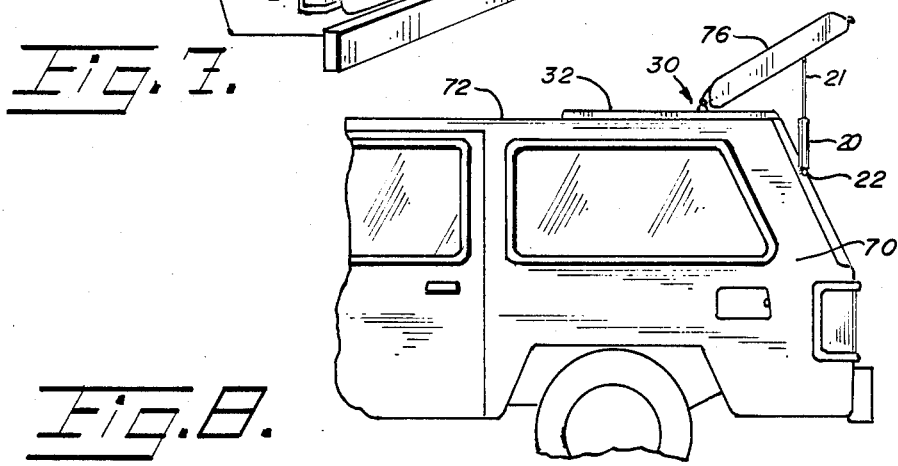
Fig. 8.

4,620,743

SLIDE MOUNTED DOOR HINGE ASSEMBLY

BACKGROUND OF THE INVENTION

This invention relates to a vehicle body for enclosing the cargo compartment of a vehicle with an opening and a door for closing the opening, and more particularly to a slide mounted door hinge assembly for mounting the door to the vehicle body.

Pickup trucks are popular roadway vehicles used for light to medium hauling. A cargo bed is located on the rear of the vehicle's frame. Low sidewalls integral with the quarter panels of the vehicle and a hinged tailgate characteristically surround the cargo bed forming what is commonly call the box of the pickup truck.

Vehicle bodies, popularly called toppers, are available in the markplace for completely covering the box thereby creating an enclosed cargo compartment. A topper has a roof, depending sidewalls, a rear opening and a pivotally mounted door for closing the opening above the tailgate. The topper sidewalls rest upon, and are affixed to, the sidewalls of the box. The door is hinged to the topper adjacent the roof. Toppers protect the box and cargo from the weather and may be conveniently locked to deter theft of any items within the cargo compartment.

Extendable parallel struts are pivotally connected between the inside of the door and the sidewalls of the topper. The struts guide the swinging movement of the door between its open and closed positions and are generally biased by a spring to lift the door to its open position and hold it there.

The conventionally mounted topper door has limited swinging movement in the range of approximately 90 degrees from its closed vertical position to its open generally horizontal position. This is so because of its fixed hinge arrangement and the limited range of extension of the struts. When the door is in its open horizontal position, it creates restricted overhead clearance at the rear of the vehicle. Loading or unloading cargo from the cargo compartment is thereby hampered or cramped by the opened overhead door. People also must be conscious of the door's location to avoid bumping their heads on the opened door while moving about the rear of the vehicle.

Travel with the conventional topper door open while hauling oversized cargo may be hazardous and is generally not recommended. Vibration or jerking of the vehicle typically associated with its motion will cause wear or fatigue of the hinges, struts and their connections because they support the opened door's weight while in this position. Should the struts release or drop the door from its open position, the topper, its door and/or any cargo extending thereout may be damaged.

SUMMARY OF THE INVENTION

The invention is a vehicle body or topper enclosing the cargo bed of a pickup truck having a slide mounted door hinge assembly. The topper has a rear opening and a hinged door for closing the opening. The assembly comprises a pair of elongated guide tracks affixed to the roof of the topper with each track extending perpendicularly from the opening. Two hinges are provided, each including a sliding leaf slidably connected to one of the guide tracks and pivotally connected to a door leaf that is affixed to the top of the door adjacent the track. A pair of extendable struts are pivotally connected between the inside of the door.

The hinge assembly provides for conventional movement of the closed vertical door to an open horizontal position while yet advantageously permitting the opened door to be moved along the tracks to a retracted position onto the roof of the topper away from the opening. The struts lift, support and guide the door as it moves between its closed, open and retracted positions.

By this arrangement, overhead clearance restrictions at the rear of the pickup truck, found in conventional topper door connecting arrangements, may be completely eliminated by sliding the door to its retracted position. The pickup truck and topper may travel with the door in this position and thereby provide for hauling of oversized cargo safely. Moreover, because the weight of the retracted door is on the roof there is no wear to the hinge assembly, struts and their respective connections.

BRIEF DESCRIPTION OF THE DRAWINGS

FIG. 1 is a perspective view of a pickup truck and topper having the hinge assembly;

FIG. 2 is a perspective view of the hinge assembly with the topper door closed;

FIG. 3 is a crosscut view of the hinge assembly along lines 3—3 of FIG. 2;

FIG. 4 is a side elevational view of the sliding leaf in the guide track which is partially broken away;

FIG. 5 is a side elevational view of the topper and hinge assembly with the topper door opened;

FIG. 6 is a broken away side elevational view of the hinge assembly of FIG. 5 with the topper door retracted;

FIG. 7 is a perspective view of a modified topper broken away having the hinge assembly;

FIG. 8 is a side elevation view of the hinge assembly on another vehicle partially broken away; and FIG. 9 is a perspective view of a topper partially broken away having a modified hinge assembly.

DETAILED DESCRIPTION

Referring to FIG. 1, pickup truck 10 has a topper 12 suitably attached thereto over its box. Topper 12 has a roof 14, depending sidewalls 15, a rear opening 16 and a close-fitting door 18. The lateral margins of roof 14 preferably slope downwardly toward depending sidewalls 15 (FIGS. 1, 5 and 6). Door 18 is connected to topper 12 by two slide mounted door hinge assemblies 30 and a pair of struts 20. Each hinge assembly includes an elongated guide track 32 and a hinge 38.

Guide tracks 32 are preferably parallel, extend generally perpendicularly from opening 16 and are suitably affixed to roof 14 by screws, rivets or the like. Tracks 32 appropriately may be made of metal.

As more specifically shown in FIGS. 2, 3 and 4, each guide track 32 has retaining channel 34 with opposing lips 36. Stop 33 is affixed by screws, rivets or the like in channel 34 at its end adjacent opening 16. Another stop 35, similar to stop 33, may be affixed at the other end of channel 34 thereby closing or plugging the open ends of channel 34.

Hinge 38 connects door 18 to topper 12 and includes sliding leaf 40 and door leaf 46 which are pivotally connected by pin 48. Sliding leaf 40 has base 42 which slidably fits in channel 34, is retained there by lips 36 and is prevented from sliding thereout towards opening 16 by stop 33. Sliding leaf 40 is preferably made of a durable high density, self-lubricating plastic so that it may easily slide longitudinally in channel 34. Door leaf 46 is suitably affixed to the top of door 18 by screws, rivets or the like and may be made of metal.

As shown in FIGS. 1, 5 and 6, extendable struts 20 are appropriately pivotally connected between the inside of door 18 and sidewalls 15 adjacent opening 16 in generally lateral parallel relationship. Struts 20 are preferably sealed air cylinders with shafts 21 extending thereout. Struts 20 tend to extend at a steady rate thereby lifting door 18 to its open horizontal position and hold it there. Other types of strut constructions, such as coacting channeled-type struts with coil or torsion springs, may also work with hinge assembly 30.

In FIGS. 5 and 6 the operation of hinge assembly 30 may be seen. Initially, door 18 is conventionally opened from its closed vertical position (FIG. 2) to its open horizontal position "A". Struts 20 assist in lifting door 18 and are fully extended when door 18 is in opened position "A".

The operator then pushes door 18 forward to retracted position "C". During this movement, base 42 of sliding leaf 40 slides forward in channel 34. Struts 20 remain fully extended as they pivot at their connected bases 22 guiding door 18. The top ends of shafts 21 of struts 20, which are connected to door 18, and the bottom of door 18 move arcuately from their rearward position "A" to forward position "C" until the forward and downward movement of door 18 ceases when the bottom of door 18 comes downardly to rest on guide tracks 32. Alternatively, the forward and downward movement of the bottom of door 18 will stop when sliding leaves 40 encounter stops 35 which may be optionally inserted into channels 32. Struts 20 do not strike roof 14 because the sloping lateral margins of roof 14 provide adequate clearance for struts 20.

Opened door 18 need not be pushed to fully retracted position "C" and may be moved to any position between positions "A" and "C" such as intermediate position "B". In position "B", the bottom of door 18 has been further elevated because strut 20 remains fully extended and is in its most vertical location of its arcuate path of movement. Such a position may provide adequate clearance for the operator without fully retracting door 18 to position "C".

When door 18 is in retracted position "C" on roof 14, the vehicle 10 may be operated without fear that the air resistance from forward vehicle motion will move door 18 backwards. This is so because struts 20 resist horizontal rearward motion of door 18 and will effectively hold door 18 in retracted position "C".

By this arrangement, truck 10 may safely haul oversized cargo that juts out from opening 16 with door 18 in this retracted position "C". Additionally, because the weight of door 18 lies on guide tracks 32, there is no excessive wear of struts 20 and hinges 38 caused by vibration from vehicle 10's motion.

To close door 18 from its retracted position "C", the bottom of door 18 must be lifted and pulled along the swinging arc of shaft's 21 top ends. Door 18 is continuously pulled past position "B" to open horizontal position "A". This motion is essentially the reverse path of pushing door 18 to its retracted position "C" from opened position "A". From position "A", door 18 may then be swung conventionally downward to its closed vertical position.

Referring to FIG. 7, truck 10 has its tailgate removed and topper 12 has full door 60 replacing door 18 for completely closing the enlarged rear opening 16. Full door 60 is similarly connected to topper 12 by hinge assembly 30. However, because struts 22 must lift, support and guide full door 60, their capacity and size must be proportioned for full door 60's heavier weight. Additionally, stops 35 are preferably affixed in channels 32 to stop the forward and downward arcuate movement of the bottom of full door 60 because its bottom will not completely move onto roof 14. This is so because of the limited extension of struts 20.

As shown in FIG. 6, several vehicles are presently being manufactured wherein their vehicle bodies enclosing their cargo compartments are integral with, and not detachable from, the vehicles 70. "station wagons", "suburbans" and "travel-alls" are common names for such vehicles. Hinge assembly 30 will effectively operate with such a vehicle 70 and may be installed during the vehicle 10's manufacture. Additionally, guide track 32 may be integrally formed to be flush mounted in vehicles 70's roof 72.

A modified hinge assembly 86 is shown in FIG. 9. Pickup truck 10 has topper 80 with roof 82 and door 84. Hinge assemblies 86 also each include guide track 88, sliding leaf 90, door leaf 92 and pin 94. Because door 84 is dissimilar from door 18 and has no horizontal top surface for mounting door leaf 92, door leaf 90 must be mounted vertically on the front of door 84. Operation of hinge assembly 86 is similar to that of assembly 30.

It is believed that the hinge assembly of the invention is suitable for other types of vehicle bodies not specified here. That is, wherever it is desirable to move the door away from the opening, the hinge assembly may be applicable if adequate clearances are allowed.

Therefore, the present invention may be embodied in other specific forms without departing from the spirit or essential attributes thereof. The illustrated embodiments should be considered in all respects as illustrative and not restrictive, reference being made to the appended claims rather than to the forgoing description to indicate the scope of the invention.

That which is claimed is:

1. A slide mounted door hinge asesmbly for a vehicle body having a roof, depending sidewalls, an opening for access into the vehicle body and a pivotally mounted door at the opening for closing the opening, comprising
  (a) an elongated guide track affixed to the outside of the vehicle body extending substantially perpendicular from the opening; and
  (b) a hinge slideably connected to the guide track and affixed to the edge portion of the door adjacent the track with the opposing edge portion of door being adapted to be swingable away from the vehicle body for pivotally and slidably mounting the door to the vehicle body thereby permitting pivotal movmement of the closed door to an open position and further permitting sliding movement of the opened door along the track to a retracted position away from the opening.

2. The assembly of claim 1, wherein the hinge includes a sliding leaf slidably connected to the guide track and pivotally connected to a door leaf affixed to the door.

3. The assembly of claim 2, wherein the sliding leaf is made of a durable high density, self-lubricating plastic.

4. The assembly of claim 2, wherein the sliding leaf has a base and the guide track has an elongated retaining channel for slidably holding the base of the sliding leaf.

5. The assembly of claim 1, further comprising a second guide track extending substantially perpendicular from the opening and a second hinge slidably connected to the second guide track and affixed to the door adjacent the second track.

6. The assembly of claim 1, further comprising a pair of extendable struts pivotally connected between the inside of the door and the sidewalls of the vehicle body for guiding the door's movement between its closed and retracted positions.

7. A vehicle body enclosing a cargo compartment, comprising
   (a) a rigid enclosure having a roof and sidewalls depending from the roof and defining a horizontally facing opening providing access into the enclosure,
   (b) a generally upright and swingable door traversing said opening, the door having edge portions adjacent the periphery of the opening in the enclosure,
   (c) hinge means mounting one edge portion of the door with the opposing edge portion of the door being adapted to be swingable away from the enclosure to facilitate swinging the door out of the opening, the hinge means including a mounting slide to be supported on the enclosure, and
   (d) an elongate track mounted on the outside of the rigid enclosure adjacent said one edge portion and extending along the enclosure and away from the opening, the track receiving and guiding the slide therealong toward and away from the opening to accommodate swingable opening and closing of the door and sliding of the door along the track and enclosure.

8. The vehicle body according to claim 7 and guide means connected between the door and the enclosure and maintaining orientation of the door during sliding movement thereof.

9. The vehicle body according to claim 7 wherein the track is mounted on the roof.

10. The vehicle body according to claim 9 and guide means between the door and enclosures and having resilient means exerting lifting force on the door during swinging of the door.

11. The vehicle body according to claim 7 wherein the slide includes an elongate slide body guided longitudinally along the track, and the hinge means also includes a hinge part affixed to the door and having a pivotal connection to the slide body, the pivotal connection having a pivot axis transverse to the track.

12. A slide mounted door hinge assembly for a pickup truck topper enclosing the truck's box thereby forming a cargo compartment with a rear opening and a pivotally mounted door for closing the opening, comprising
   (a) two generally parallel elongated guide tracks affixed to the outside of the roof of the topper extending substantially perpendicular from the opening and each track having an elongated retaining channel:
   (b) two hinges, each hinge including a durable self-lubricating plastic leaf with a base slidably retained in one of the channels of the guide tracks and pivotally connected to a door leaf affixed to the top edge portion of the door adjacent the track with the opposing edge portion of the door being adapted to be swingable away from the topper for pivotally and slidably mounting the door to permit outward and upward movement of the closed door to an opened position and further permitting sliding movement of the opened door along the tracks to a retracted position on the roof od the topper away from the opening; and
   (c) a pair of extendable struts pivotally connected between the inside of the door and the topper sidewalls adjacent the opening in a generally parallel lateral relationship for guiding the door's movement between its closed and retracted positions.

* * * * *

UNITED STATES PATENT AND TRADEMARK OFFICE
CERTIFICATE OF CORRECTION

PATENT NO.  : 4,620,743
DATED       : November 4, 1986
INVENTOR(S) : Alan B. Eke It is certified that error appears in the above-identified patent and that said Letters Patent is hereby corrected as shown below:

Column 3, line 30, delete "downardly" and substitute --downwardly--.

Column 6, line 31, delete "od" and substitute --of--.

Signed and Sealed this

Twenty-first Day of April, 1987

Attest:

DONALD J. QUIGG

Attesting Officer

Commissioner of Patents and Trademarks